United States Patent [19]

Sumino

[11] Patent Number: 4,519,250
[45] Date of Patent: May 28, 1985

[54] ULTRASONIC DIAGNOSIS APPARATUS USING REDUCED NUMBERS OF PHOTO TRANSMISSION LINES

[75] Inventor: Yoichi Sumino, Otawara, Japan
[73] Assignee: Tokyo Shibaura Denki Kabushiki Kaisha, Japan
[21] Appl. No.: 516,254
[22] Filed: Jul. 22, 1983

Related U.S. Application Data

[63] Continuation-in-part of Ser. No. 250,201, Apr. 2, 1981, abandoned.

[30] Foreign Application Priority Data

May 8, 1980 [JP] Japan ................. 55-59942

[51] Int. Cl.³ ............................................ G01N 29/00
[52] U.S. Cl. ........................................ 73/626; 73/628; 455/603; 455/612; 367/79
[58] Field of Search ................. 73/625, 626, 628, 629; 455/603, 612; 367/79

[56] References Cited

U.S. PATENT DOCUMENTS

| | | |
|---|---|---|
| 3,911,730 | 10/1975 | Niklas . |
| 4,064,741 | 12/1977 | Reynolds ............... 73/620 |
| 4,117,448 | 9/1978 | Siems ................... 367/79 |
| 4,208,916 | 6/1980 | Thomenius et al. ......... 73/628 |
| 4,224,829 | 9/1980 | Kawabuchi et al. ........ 73/626 |
| 4,276,656 | 6/1981 | Petryk, Jr. ............. 455/612 |
| 4,290,146 | 9/1981 | Adolfsson et al. ........ 455/612 |
| 4,300,166 | 11/1981 | Marey ................... 455/603 |
| 4,320,660 | 3/1982 | Tancrell ................. 73/626 |
| 4,441,180 | 4/1984 | Schissler ............... 455/612 |

OTHER PUBLICATIONS

"Electronic Sector Scanning in the Diagnosis of Cerebrovascular Disease and Space-Occupying Processes", Freund et al., *Neurology*, Nov. 1973, vol. 23, No. 11, pp. 1147–1159.

*Primary Examiner*—Howard A. Birmiel
*Attorney, Agent, or Firm*—Finnegan, Henderson, Farabow, Garrett & Dunner

[57] ABSTRACT

Ultrasonic diagnosis apparatus including a plurality of transducer elements in a probe actuated by electric pulses for emitting ultrasonic pulses, for receiving echo ultrasonic pulses, and for issuing electric pulses corresponding to the echo pulses; a pulse generator; apparatus for processing the electric pulse information issued by the probe; a photo transmission line interconnecting the pulse generator and the probe and interconnecting the probe and the processing apparatus; and devices for converting electric pulses to photo pulses for conveyance on the photo transmission line and devices for reconverting the photo pulses to electric pulses after conveyance on the photo transmission lines are utilized with M number of multiplexers. Each multiplexer has L number of taps to drive N number of transducer elements where N=M×L. A preprogrammed controller sequences the actuation of the transducer elements such that M number of transducer elements are actuated for each electric pulse generated by the generator.

4 Claims, 5 Drawing Figures

ULTRASONIC DIAGNOSIS APPARATUS USING REDUCED NUMBERS OF PHOTO TRANSMISSION LINES

This application is a continuation-in-part of application Ser. No. 250,201, filed on Apr. 2, 1981, entitled Ultrasonic Diagnosis Apparatus, now abandoned.

BACKGROUND OF THE INVENTION

This invention relates to an ultrasonic diagnosis apparatus and, more particularly, to electronic scan type ultrasonic diagnosis apparatus including a signal transmission line using a reduced number of photo transmission lines between an ultrasonic probe and transmitting-receiving devices.

In conventional ultrasonic diagnosis apparatus, an ultrasonic probe and a transmitter-receiver are generally connected with individually shielded electric wires. Since electronic scan type ultrasonic apparatus has, for example, in the past had about 30 to 100 transducer elements in its probe, it needed 30 to 100 electric wires for actuating the transducer elements. Also, the configuration of the ultrasonic probe, including the electric wires, has been very difficult to deal with because it is impossible not only to decrease the diameter of each electric wire further but also to increase the lengths of the wires due to high frequency attenuation since the available scope of ultrasonic frequency is quite high, being about 1 to 10 MHz.

Moreover, in the transmitting of both the transmitting and receiving signals through the shielded wires, the metallic materials composing the wires become a receiving antenna for external electronic noise waves. As a result, the signals transmitted through the shielded wires are affected and the ultrasonic image displayed on a monitor is deteriorated. Additionally, since cross talk of about −40 dB exists between the shielded wires, it has been impossible to completely clear the displaying image on the monitor from interference when using shielded wires for the signal transmission line, even if other problems are resolved.

SUMMARY OF THE INVENTION

It is accordingly an object of this invention to improve ultrasonic diagnosis apparatus by eliminating mutual cross talk between the transmission elements of the signal transmission line connecting an ultrasonic probe to the remainder of the ultrasonic apparatus.

It is another object of the invention to provide ultrasonic diagnosis apparatus which is not affected by external electronic noise acting on the signal transmission line connecting the ultrasonic probe and the transmitting-receiving apparatus.

It is yet another object of the invention to make possible the reduction in the size, and the improvement of the manipulatability, of the ultrasonic probe in ultrasonic diagnosis apparatus.

It is a further object of the invention to reduce the number of individual photo transmission lines in the signal transmission line to lower the cost of the line and to improve its flexibility while allowing for the use of a relatively large number of transducer elements in the ultrasonic probe.

Briefly, these and other objects are achieved in accordance with a first aspect of the invention by an ultrasonic diagnosis apparatus comprising an ultrasonic probe including N number of transducer elements actuated by electric pulses for emitting ultrasonic pulses, for receiving echo ultrasonic pulses, and for issuing electric pulses corresponding to the echo pulses; a pre-programmed controller for designating the sequence of actuation of the transducer elements; electronic pulse generator for actuating the transducer elements; means for processing the electronic pulses corresponding to the echo pulses, including a delay circuit, adder, amplifier, detector, and image display; a signal transmission line including M number of photo transmission lines for conveying photo pulses, the line interconnecting the generator and the probe and interconnecting the probe and the delay circuit of the processing means; electric-photo convertors for converting the generated electric pulses and the issued electric pulses to photo pulses for conveyance on the signal transmission line; photo-electric convertors for converting the photo pulses conveyed by the signal transmission line to electric pulses for actuating the transducer elements and for feeding the delay circuit of the processing means; and M number of multiplexers in the ultrasonic probe for actuating M number of transducers elements for each electric pulse generated by the generator and for forwarding to the delay circuit of the processing means the issued electric pulses corresponding to the echo pulses, the multiplexers being controlled by the pre-programmed controller. In a preferred embodiment, the photo transmission line is composed of at least one optical fiber.

DESCRIPTION OF THE PREFERRED EMBODIMENTS

Figure 1:
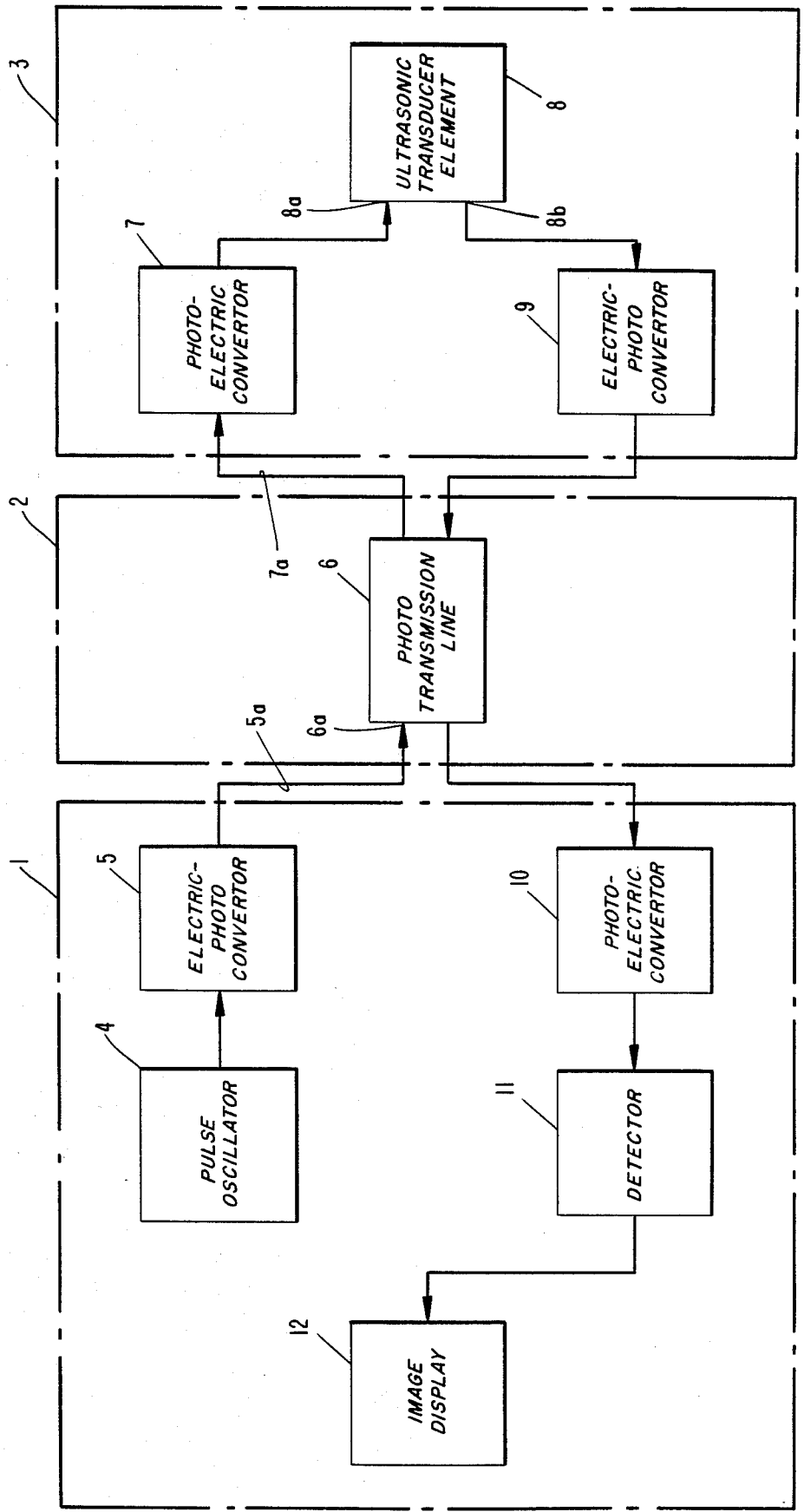
FIG. 1 is a schematic block diagram to illustrate one embodiment of the ultrasonic diagnosis apparatus according to this invention.

Referring to FIG. 1, an ultrasonic diagnosis apparatus main unit 1 and an ultrasonic probe 3 are connected with a transmitting-receiving signal transmission part 2. Included in the main unit 1 are a pulse oscillator 4 emitting timed electrical pulses and an electric-photo convertor 5 for converting the electric pulses generated by the pulse oscillator to photo pulses. These photo pulses are conveyed by an optical passage 5a from the electric-photo convertor 5 to the input terminal 6a of a photo transmission line 6 composing a portion of the signal transmission part 2.

The photo transmission line 6 is composed of optical fiber. The output terminal of the photo transmission line 6 is connected via an optical passage 7a to a photo-electric convertor 7 physically located in the ultrasonic probe 3. The photo-electric convertor 7 converts the photo pulses again to electric pulses which are fed to the input terminal 8a of an ultrasonic transducer element 8.

The ultrasonic transducer element 8 includes at least one piezoelectric-crystal element and is actuated by the electric pulses generated from the photo-electric convertor 7 to emit ultrasonic sound waves. The emitted ultrasonic sound waves are reflected by the objective parts of the subject, such as a human body, and the piezoelectric-crystal element is again actuated by the reflected ultrasonic echos to generate electric pulse signals from its output terminal 8b.

The electric pulse signals emitted from the piezoelectric-crystal elements are converted to photo pulse signals by a electric-photo convertor 9 and sent through the photo transmission line 6 to photo-electric convertor 10 for converting the incoming photo pulse signals back to electric echo signals. The electric echo signals from the convertor 10 are detected by a detector 11 and amplitude modulated to provide brighting spots on the displaying screen of the image display 12, as known in the art.

Thus, the ultrasonic echo information is converted to a display image without electronic interference. By utilizing a photo transmission line as the signal transmission line, there is no problem as to the size of the wires as in the previously described conventional apparatus. The length of the line is not affected by ultrasonic frequency and the display is not influenced by external electronic noise or by internal cross talk.

Figure 2:
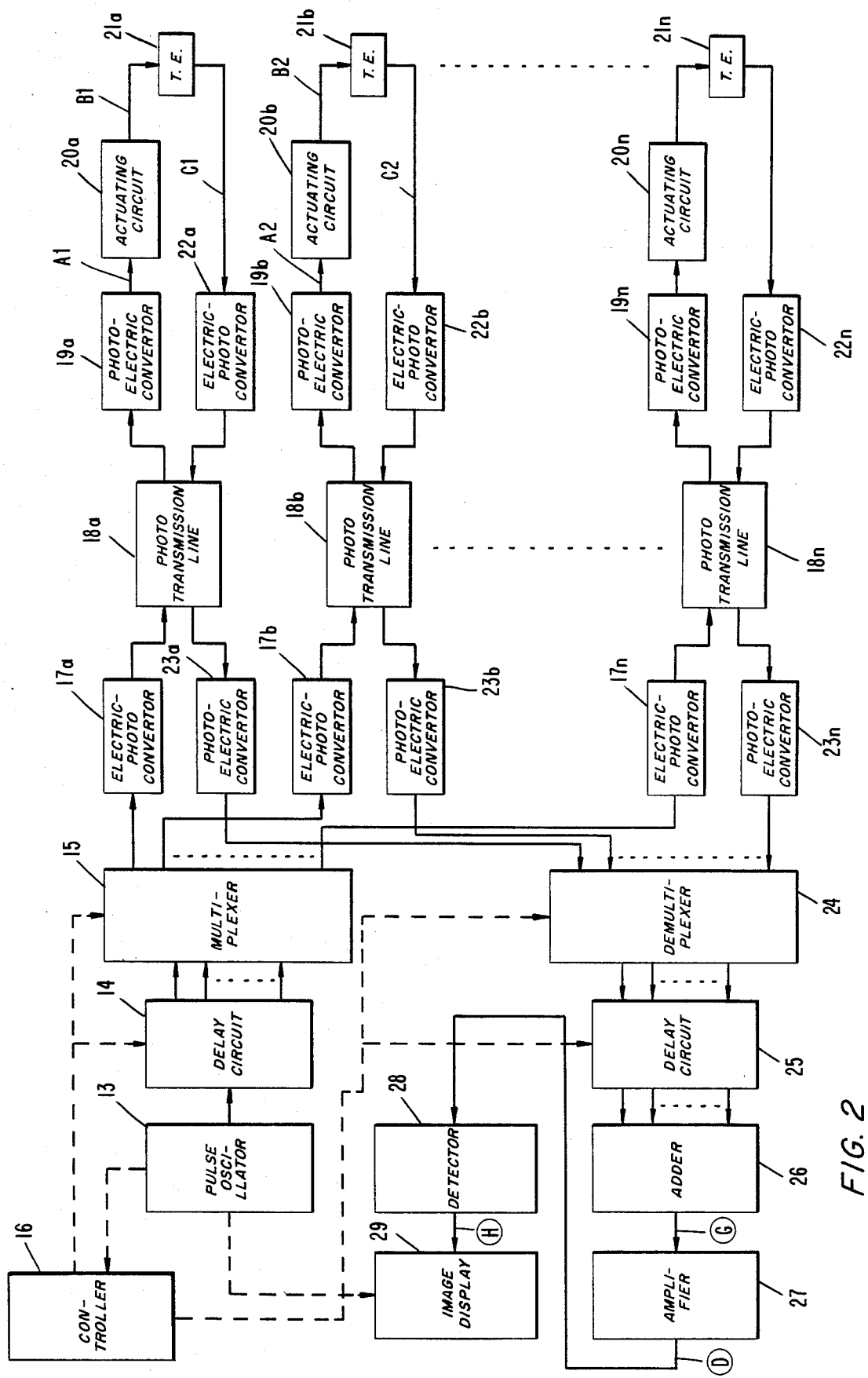
FIG. 2 is a schematic block diagram to illustrate another embodiment according to the invention.

I will now explain about the case of applying the invention to electronic scan type ultrasonic diagnosis apparatus referring to FIG. 2. Electronic scan type apparatus simultaneously actuates both a plurality of transducer elements and utilizes delay circuits for narrowing emitting ultrasonic beams. Since two transducer elements are normally actuated in that apparatus, that number will be used for purposes of illustration.

First, timed electric signals, on which the ultrasonic sound waves are based, are issued by a pulse oscillator 13. The electric signals are applied to a delay circuit 14 which generates two trains of output pulses having a predetermined difference in phase. A previously programmed controller 16, synchronized with the pulses of the oscillator 13, issues a signal selecting the pair of transducer elements 21 from the transducer elements 21a, 21b . . . 21n to be actuated.

The signal from the controller 16 is applied to the delay circuit 14 and to a multiplexer 15, the delay circuit issuing the two trains of out-of-phase pulses to the multiplexer.

It is assumed that the transducer elements 21a and 21b are chosen by the signals sent to the multiplexer 15 by the controller 16. The output pulses from the multiplexer 15 are converted to photo signals by electric-photo convertors 17a, 17b and then sent through photo transmission lines 18a, 18b, respectively, of the photo transmission lines 18a, 18b, . . . 18n. The photo signals are then reconverted to electrical signals by photo-electric convertors 19a and 19b for applying pulses A1 and A2 (referring to FIG. 3(a) and (b), respectively, to actuating circuits 20a and 20b.

The actuating pulses A1 and A2 have the predetermined phase difference for narrowing the ultrasonic beam. Actuating pulses B1 and B2 (referring to FIG. 3(c) and (d)), respectively, corresponding to the actuating pulses A1 and A2 are supplied to the transducer elements 21a and 21b from the actuating circuits 20a and 20b to actuate the transducer elements. Consequently, ultrasonic sound waves are emitted from the transducer elements to the subject.

Figure 3:
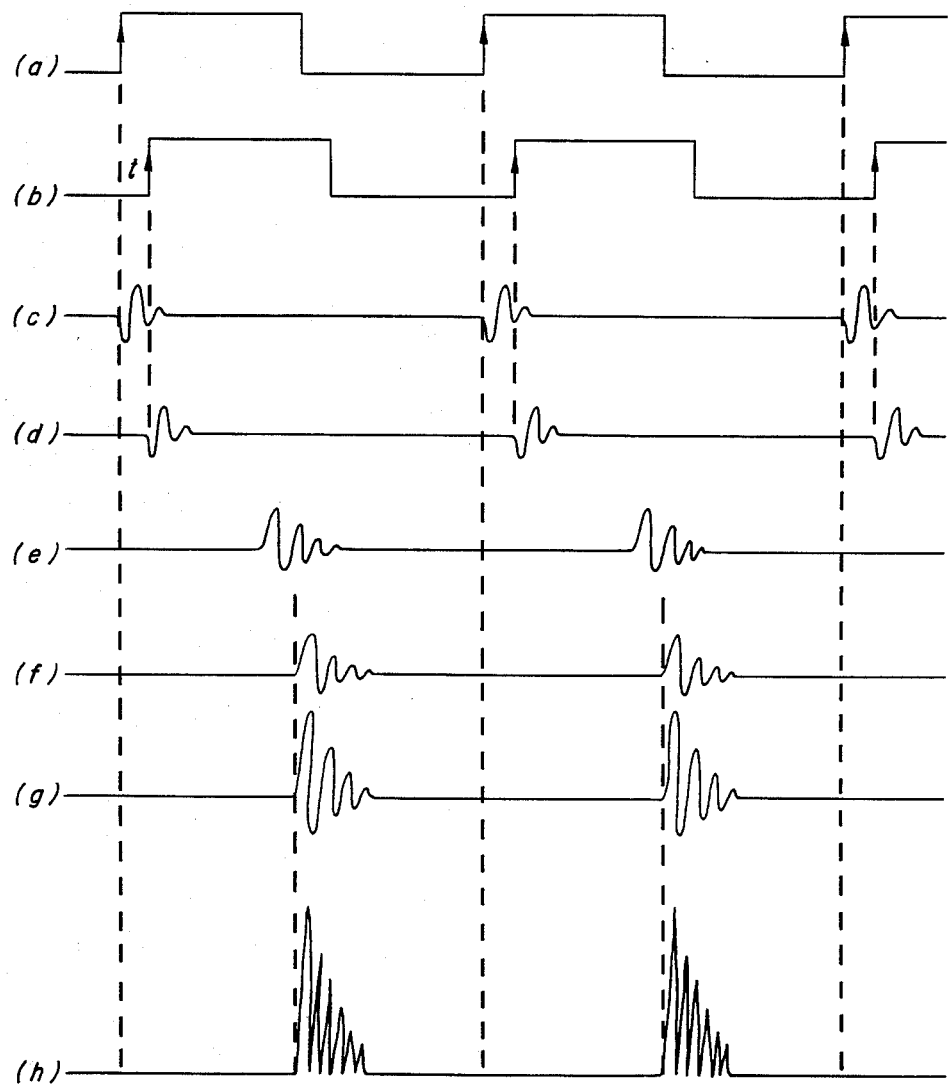
FIG. 3 is a timing chart for explaining the operation of FIG. 2.

Echo sound waves are reflected from the subject and are received by the issuing transducer element 21a and 21b again to generate electric echo signals C1 and C2 (referring to FIG. 3(e) and (f)), respectively. The electric echo signals are converted to photo signals by electric-photo convertors 22a and 22b for transmission to the main unit of the ultrasonic diagnosis apparatus through photo transmission lines 18a and 18b, respectively, where they are again converted to electric signals by photo-electric convertors 23a and 23b. A demultiplexer 24 receives only the signals from the transducer elements 21a and 21b under a control signal from the controller 16 for application to a delay circuit 25.

By the delay circuit 25, the electric echo signals are respectively modulated by delay times complementary to the delay times initiated by the delay circuit 14 to place the pulse trains in uniform phase. The phase-uniformed output signals from the delay circuit 25 are summed by an adder 26 and the combined pulse G, as shown in FIG. 3(g), is applied to an amplifier 27. The amplifier 27 amplifies the combined signal to generate an amplified signal D which is applied to a detector 28. The detector 28 generates a signal H, shown in FIG. 3(h), which is applied to an image display 29. The image display 29 modulates the signal H for brilliance, as known in the art, and displays the ultrasonic information modulated signals on the scanning lines synchronized with an output pulse from the pulse oscillator 13.

In the embodiment described above, the number of photo transmission lines necessarily equals the number of transducer elements used in the ultrasonic probe. Thus, while enjoying the benefits of using a photo transmission line as a signal transmission line, the electronic scan type ultrasonic diagnosis apparatus disclosed in FIG. 2 has its limitations either in the number of transducer elements utilized or by the required large number of photo transmission lines utilized in the signal transmission line which limits both the improved flexibility of the transmission line and the improved reduction in ultrasonic probe size. To overcome the limitation of the embodiment disclosed in FIG. 2, the embodiment illustrated in FIG. 4 and described below is provided to allow for the reduction in the number of individual photo transmission lines in the signal transmission line while allowing for the use of a relatively large number of transducer elements in the ultrasonic probe.

Figure 4:
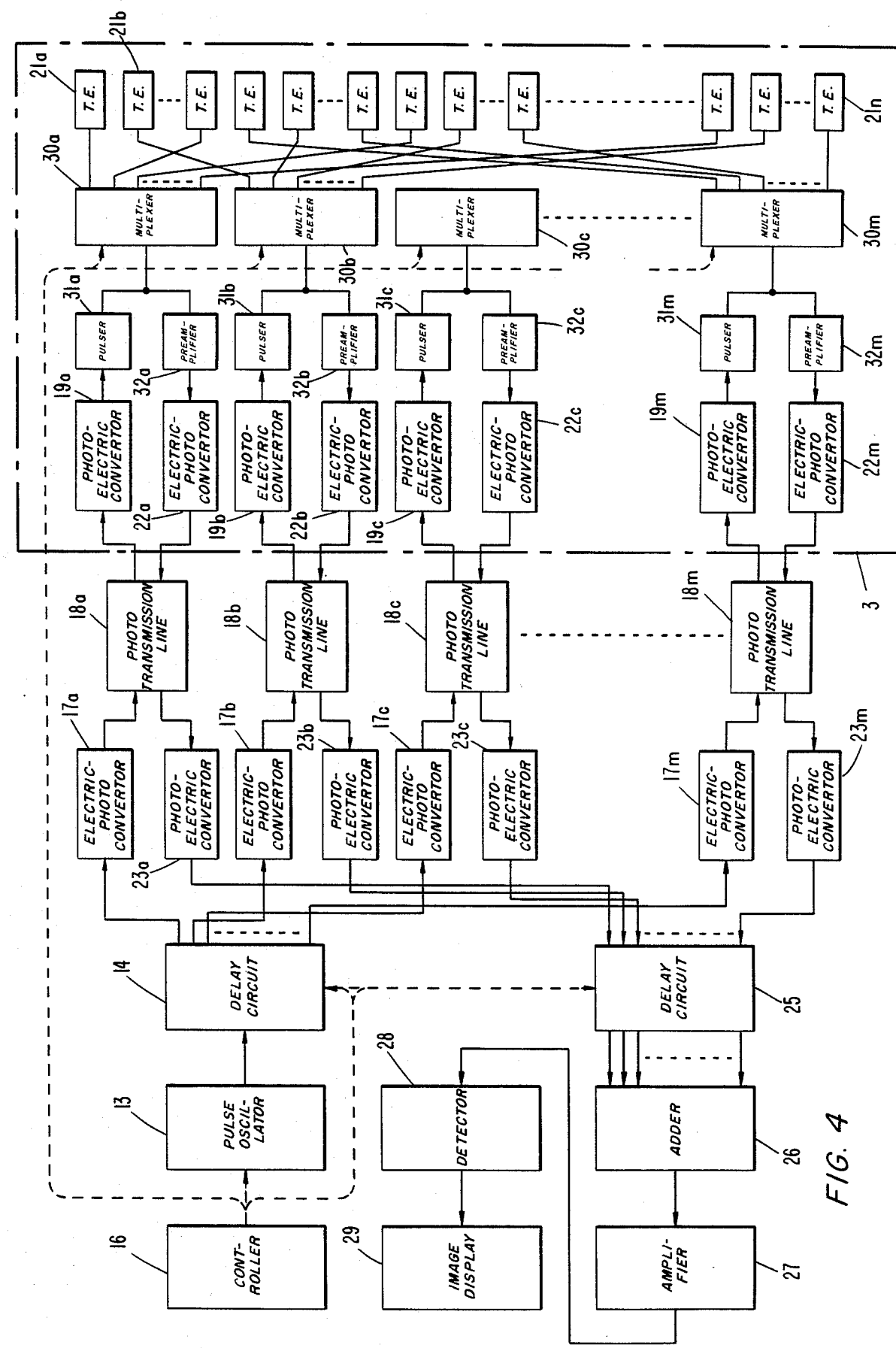
FIG. 4 is a schematic block diagram to illustrate a third embodiment according to the invention.

In the electronic scan type ultrasonic diagnosis apparatus illustrated in FIG. 4, multiplexer 15 and demultiplexer 24 of FIG. 2 have been eliminated from the generating means and the processing means, respectively, and M numbers of multiplexers 30a, 30b . . . 30m are housed in ultrasonic probe 3. Additionally, the signal transmission line of FIG. 4 consists of M numbers of photo transmission lines 18a, 18b . . . 18m, and ultrasonic probe 3 contains N number of transducer elements 21a, 21b, . . . 21n, the integral M being less than the integral N.

Each multiplexer 30 is connected between (1) a circuit which includes a photo-electric convertor 19 and an electric-photo convertor 22 and (2) a plurality of transducer elements 21. A pulser 31 is connected between a photo-electric convertor 31 and the respective multiplexer 30 to receive the electric signal from the photo-electric convertor for applying pulses to that multiplexer. A preamplifier 32 is connected between a multiplexer and its respective electric-photo convertor to amplify the electric echo signal and to actuate the electric-photo convertor. As illustrated in FIG. 4, there are M numbers of photo-electric convertors 19, pulsers 31, preamplifiers 32, and electric-photo convertors 22.

Figure 5:
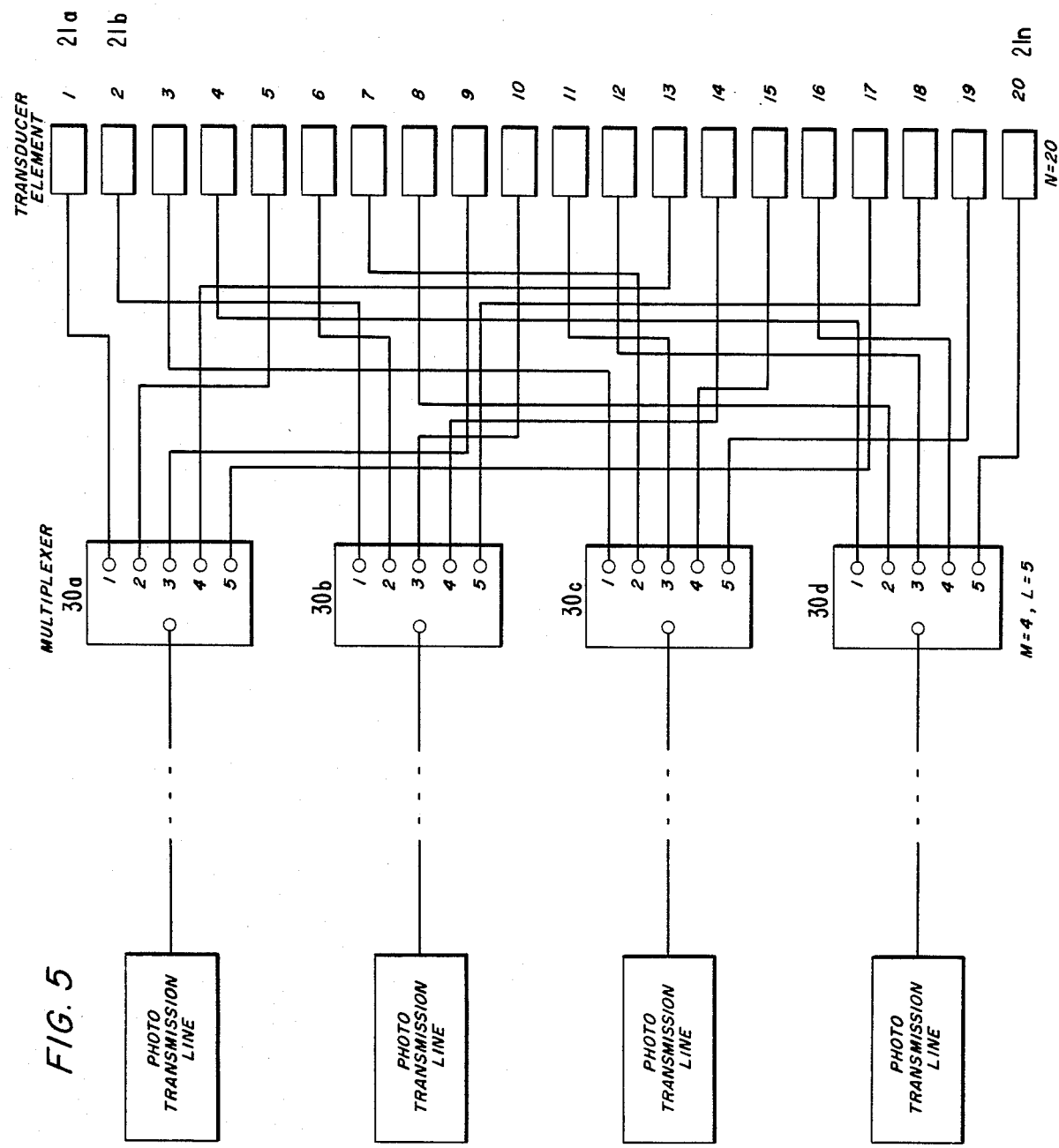
FIG. 5 is a schematic block diagram of a portion of an ultrasonic probe and photo transmission lines to illustrate the operation of FIG. 4 using four photo transmission lines, four multiplexers, and twenty transducer elements.

As partially shown in FIG. 4 and more fully shown in the specific example illustrated in FIG. 5, each multiplexer 30 has L numbers of taps. A tap is connected to one transducer element 21; thus each multiplexer 30 operates to distribute driving pulses to L number of transducer elements. Accordingly, the number of transducer elements 21a, 21b, . . . 21n, i.e. the number N, equals the M times L. For example, as shown in FIG. 5, and more fully decribed below, four (M) multiplexers 30a, 30b, 30c, and 30d each have five (L) taps thus allowing for the use of twenty (N) transducer elements 21 in ultrasonic probe 3. In another preferred embodiment, one hundred and twenty-eight transducer elements are ultilized with thirty-two photo transmission lines 18, and thirty-two mutliplexers each having four taps.

Multiplexers 30a, 30b, . . . 30m operate to distribute driving pulses from pulsers 31a, 31b, . . . 31m for actuating N numbers of transducers 21a, 21b, . . . 21n M numbers at a time in a predetermined order as controlled by the pre-programmed controller 16. Similarly, the receiving echo signals from transducer elements 21a, 21b, . . . 21n are distributed by the same multiplexers into preamplifiers 32a, 32b, . . . 32m for conversion and transmission through photo transmission lines 18a, 18b, . . . 18m for further processing in the processing means resulting in an image being displayed on image display 29.

The control signals from pre-programmed controller 16 are issued to the multiplexers 30a, 30b, . . . 30m via a transmission line as shown in FIG. 4. Being a digital signal, the control signal is not greatly influenced by the environment; thus its transmission line can be electrical wiring. However, the electrical line may be replaced with a photo transmission line if desired.

In operation, the embodiment illustrated in FIG. 4 is similar to the operation of the embodiment in FIG. 2 except that, with the use of multiplexers 30a, 30b, . . . 30m in ultrasonic probe 3, only M number of photo transmission lines 18 are necessary to provide actuating pulses to a relatively large number N of transducer elements 21a, 21b, . . . 21n.

Briefly, timed electric signals are issued by pulse oscillator 13 into delay circuit 14 which generates trains of output pulses having a predetermined difference in phase. Pre-programmed controller 16, synchronized with the pulses of oscillator 13, issues a signal to multiplexers 30a, 30b, . . . 30m for designating the sequence of actuation of the transducer elements. Controller 16 is also applied to delay circuit 14 to control the issuance of the out-of-phase pulses which are to be transmitted through photo transmission lines 18.

The output pulses of delay circuit 14 are converted to photo signals by electric-photo convertors 17 and sent through photo transmission lines 18. The photo signals are reconverted to electrical signals by photo-electric convertors 19 and applied to pulsers 31 which, in turn, feed pulses to multiplexer 30 which drive N numbers of transducers M numbers at a time in a predetermined order as controlled by controller 16.

Ultrasonic sound waves are emitted from the respective transducer elements to the subject being investigated. Echo sound waves are reflected from that subject and received by the issuing transducer element. The issuing transducer element generates an electrical pulse which is fed into the appropriate multiplexer 30 for distribution to the appropriate preamplifiers 32 and subsequent return to delay circuit 25 in the processing means where it is processed into an intelligible image on image display 29.

FIG. 5 shows a portion of ultrasonic probe 3 of an electronic scan type ultrasonic diagnosis apparatus of the type illustrated in FIG. 4 in which there are four photo transmission lines 18a, 18b, 18c, and 18d and four multiplexers 30a, 30b, 30c and 30d (each multiplexer having five taps numbered 1, 2, 3, 4, and 5) and twenty transducer elements 21a, 21b, . . . 21t.

The switches in multiplexers 30a, 30b, 30c, and 30d are set as stated below in compliance with the pulses from controller 16. Namely, where the tap numbers of a multiplexer are designated 1, 2, 3, 4, and 5 representing a switch in the multiplexer, the order of sequencing is as follows:

| PULSE ORDER FROM CONTROLLER 16 | MULTIPLEXERS 30a, 30b, 30c, and 30d (SWITCH SEQUENCING BY TAP NUMBER) | ACTUATED TRANSDUCER ELEMENTS 21a, 21b, . . . 21t |
|---|---|---|
| pulse 1 | (1, 1, 1, 1) | 1, 2, 3, 4 |
| 2 | (2, 1, 1, 1) | 2, 3, 4, 5 |
| 3 | (2, 2, 1, 1) | 3, 4, 5, 6 |
| 4 | (2, 2, 2, 1) | 4, 5, 6, 7 |
| 5 | (2, 2, 2, 2) | 5, 6, 7, 8 |
| 6 | (3, 2, 2, 2) | 6, 7, 8, 9 |
| 7 | (3, 3, 2, 2) | 7, 8, 9, 10 |
| 8 | (3, 3, 3, 2) | 8, 9, 10, 11 |
| 9 | (3, 3, 3, 3) | 9, 10, 11, 12 |
| 10 | (4, 3, 3, 3) | 10, 11, 12, 13 |
| 11 | (4, 4, 3, 3) | 11, 12, 13, 14 |
| 12 | (4, 4, 4, 3) | 12, 13, 14, 15 |
| 13 | (4, 4, 4, 4) | 13, 14, 15, 16 |
| 14 | (5, 4, 4, 4) | 14, 15, 16, 17 |
| 15 | (5, 5, 4, 4) | 15, 16, 17, 18 |
| 16 | (5, 5, 5, 4) | 16, 17, 18, 19 |
| 17 | (5, 5, 5, 5) | 17, 18, 19, 20 |

By the above-described relationship, twenty transducer elements are sequentially selected four elements at a time to be actuated, and the selected transducer elements are shifted laterally one element every counting pulse. The transmission and reception of an oultrasonic pulse is performed with each pulse. Since the transmission and reception of an ultrasonic pulse with each pulse corresponds to a scan line on image display 29, a B-mode image is formed by shifting laterally ultrasonic probe 3.

Each multiplexer 30 is operated such that a desired switch is selected with every pulse from controller 16, and an actuating pulse from each of pulsers 31 is transmitted to a desired transducer element 21 through each of multiplexers 30. Ultrasonic sound waves are emitted from the chosen transducer element to the subject being investigated. Echo sound waves are then reflected from that subject and received by the same issuing transducer element to output electric signals which are transmitted to each of preamplifiers 32 through each of multiplexers 30 in the same mode.

When the next pulse is delivered from controller 16, the mode of multiplexers 30 is changed to perform the transmission and reception of actuating pulses and echo signals in compliance with the changed mode. By such procedure, each fourth transducer element is actuated in a shifting manner.

One photo transmission line 18 is connected between (1) a electric-photo convertor 17 and photo-electric convertor 23 in main unit 1 and (2) photo-electric convertor 19 and electric-photo convertor 22 in ultrasonic probe 3. The transmission of pulses from delay circuit 14 to a multiplexer 30 and the transmission of echo signals from a multiplexer 30 to delay circuit 25 are performed through the same photo transmission line. This process is possible since the times of pulse transmission and echo signal transmission are different from each other.

Although the embodiments, as described, relate to electronic scan type ultrasonic diagnosis apparatus, this invention can also be applied to a sector scan type ultrasonic diagnosis apparatus. Also, the multiplexer and demultiplexer are used as electric switches for choosing the transducer elements. It is apparent that the choice of the transducer elements may be performed by using photo switches.

What is claimed is:

1. An ultrasonic diagnosis appararus comprising:
    an ultrasonic probe including N number of transducer elements actuated by electric pulses for emitting ultrasonic pulses, for receiving echo ultrasonic pulses, and for issuing electric pulses corresponding to said echo pulses;
    a pre-programmed controller for designating the sequence of actuation of said transducer elements;
    means for generating electronic pulses for actuating said transducer elements;
    means for processing said electronic pulses corresponding to said echo pulses;
    a signal transmission line including M number of photo transmission line for conveying photo pulses, said line interconnecting said generating means and said probe and interconnecting said probe and said processing means;
    first electric-photo means in said generating means for converting said generated electric pulses to photo pulses for conveynce on said signal transmission line to said probe;
    first photo-electric means in said probe for converting said photopulses generated by said first electric-photo means and conveyed by said signal transmission line to electric pulses for actuating said transducer elements;
    second electric-photo means in said probe for converting said issued electric pulses to photo pulses for conveyance on said signal transmission line to said processing means;
    second photo-electric means in said processing means for converting said photo pulses generated by said second electric-photo means and conveyed by said signal transmission line to electric pulses for feeding said processing means; and
    M number of multiplexers in said ultrasonic probe, each said multiplexer having L number of taps which are interconnected with L number of transducer elements, the number N being equal to M multiplied by L, for actuating N number of said transducer elements M number at a time for each electric pulse generated by said generating means and for receiving from said transducer elements and forwarding to said processing means said issued electric pulses corresponding to said echo pulses, said multiplexers being controlled by said pre-programmed controller to actuate said transducer elements in a predetermined sequence and to distribute said issued electric pulses from said transducer elements to said second electric-photo means in said probe for conversion to photo pulses and transmission to said processing means on the appropriate photo transmission lines within said signal transmission line, each said multiplexer being interconnected with a single photo transmission line so that the photo pulses from said generating means to a transducer element and from the same transducer element to said processing means are transmitted by the same photo transmission line.

2. The ultrasonic diagnosis apparatus of claim 1 wherein said photo transmission line is composed of at least one optical fiber.

3. The ultrasonic diagnosis apparatus of claim 1 wherein said processing means includes an image display.

4. The ultrasonic diagnosis apparatus of claim 1 wherein:
    said generating means has a first delay circuit controlled by said pre-programmed controller;
    said first electric-photo means comprises M number of first electric-photo convertors, each individual said convertor having an input connected to said first delay circuit and an output connected to one of said photo transmission lines;
    said ultrasonic probe further includes M number of pulsers and M number of preamplifiers;
    said first photo-electric means comprises M number of first photo-electric convertors and each individual said convertor has an input connected to one of said photo transmission lines and an output connected to one of said multiplexers through one of said pulsers;
    said second electric-photo means comprises M number of second electric-photo convertors and each individual said convertor has an input connected to one of said multiplexers through one of said preamplifiers and an output connected to one of said photo transmission lines;
    said processing means further includes a second delay circuit; and
    said second photo-electric means comprises M number of second photo-electric convertors and each individual said convertor has an input connected to one of said photo transmission lines and an output connected to said second delay circuit.

* * * * *